(12) United States Patent
Shen

(10) Patent No.: US 12,192,019 B2
(45) Date of Patent: **\*Jan. 7, 2025**

(54) INTEGRATED AND INTERACTIVE CHAT SUITE

(71) Applicant: The Trustees of Princeton University, Princeton, NJ (US)

(72) Inventor: Xiaoxiao Shen, Princeton, NJ (US)

(73) Assignee: THE TRUSTEES OF PRINCETON UNIVERSITY, Princeton, NJ (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/387,226

(22) Filed: Nov. 6, 2023

(65) Prior Publication Data

US 2024/0073052 A1     Feb. 29, 2024

Related U.S. Application Data

(63) Continuation of application No. 17/839,621, filed on Jun. 14, 2022, now Pat. No. 11,843,470.

(Continued)

(51) Int. Cl.
*H04L 12/18*    (2006.01)
*H04L 51/04*    (2022.01)

(52) U.S. Cl.
CPC ...... *H04L 12/1822* (2013.01); *H04L 12/1818* (2013.01); *H04L 51/04* (2013.01)

(58) Field of Classification Search
CPC .. H04L 12/1822; H04L 12/1818; H04L 51/04
See application file for complete search history.

(56) References Cited

U.S. PATENT DOCUMENTS

| 6,912,521 B2 * | 6/2005 | Kraft | H04M 3/56 |
| 9,076,129 B2 * | 7/2015 | Grewal | H04L 51/046 |

(Continued)

OTHER PUBLICATIONS

Chatplat—Integrated Interactive Chat Solution: http://web.archive.org/web/20210514033928/http://chatplat.com/.

(Continued)

*Primary Examiner* — Nazia Naoreen
(74) *Attorney, Agent, or Firm* — MEAGHER EMANUEL LAKS GOLDBERG & LIAO, LLP

(57) ABSTRACT

A system and method for chat-based studies utilizing a plurality of users may be provided, utilizing at least one chat room processor and a plurality of remote processors. The chat room processors may be configured to receive a chat room template, create a plurality of chat rooms based on the chat room template, assign participants to one chat rooms, provide instructions associated with the chat room when all participants are present, provide questions or prompts at times defined by the chat room template or when conditions defined by the chat room template are met, collect all messages received from each participant, and storing information that includes the message, a time stamp the message was sent and/or received, and at least one unique identification code associated with the participant sending the message. The remote processors are each configured to connect a participant to the system, receive and display instructions, receive and display questions or prompts, receive and display messages from other participants in the same chat room, receive input responsive to the first question or prompt after a message from another participant has been displayed, and send the input as a message to the chat room.

20 Claims, 7 Drawing Sheets

Related U.S. Application Data

(60) Provisional application No. 63/210,303, filed on Jun. 14, 2021.

(56) References Cited

U.S. PATENT DOCUMENTS

| | | | |
|---|---|---|---|
| 9,882,846 B1 * | 1/2018 | Cohen | H04L 65/1069 |
| 11,575,676 B1 * | 2/2023 | Banks | G06T 11/00 |
| 2012/0254774 A1 * | 10/2012 | Patton | H04L 51/222 |
| | | | 715/758 |
| 2020/0133439 A1 * | 4/2020 | Trim | H04L 51/216 |

OTHER PUBLICATIONS

Gorilla Experiment Builder; http://web.archive.org/web/20210516044747/https://gorilla.sc/products/tools/.

* cited by examiner

Table 1

| | Dependent variable: chat_consent | | | | |
|---|---|---|---|---|---|
| | (1) | (2) | (3) | (4) | (5) |
| extroversion_scale | 0.213** (0.105) | | 0.115 (0.120) | 0.180 (0.129) | 0.170 (0.130) |
| selfmon_scale | | 0.244** (0.110) | 0.165 (0.125) | 0.159 (0.135) | 0.127 (0.135) |
| as.numeric(pidist) | | | 0.197* (0.115) | 0.233* (0.125) | 0.236* (0.128) |
| PID_6 | | | 0.124 (0.234) | 0.042 (0.243) | 0.049 (0.245) |
| affpol_pre | | | −0.008 (0.005) | −0.007 (0.005) | −0.008 (0.005) |
| ideo_7 | | | −0.248 (0.173) | −0.156 (0.179) | −0.143 (0.180) |
| identity_scale | | | 0.147 (0.148) | 0.152 (0.153) | 0.129 (0.156) |
| media_scale | | | −0.021 (0.123) | −0.043 (0.127) | −0.056 (0.130) |
| male | | | | −0.305 (0.234) | −0.302 (0.237) |
| age | | | | −0.016* (0.010) | −0.013 (0.010) |
| college | | | | 1.008*** (0.394) | 1.112*** (0.401) |
| expressor | | | | | 1.025** (0.414) |
| sm_postpol_num_nazero | | | | | −0.202 (0.142) |
| Constant | 0.929*** (0.105) | 0.932*** (0.106) | 0.912 (0.722) | 0.441 (0.853) | −0.159 (0.882) |
| Observations | 449 | 449 | 448 | 432 | 432 |
| Log Likelihood | −266.301 | −265.809 | −260.371 | −248.429 | −244.644 |
| Akaike Inf. Crit. | 536.603 | 535.617 | 538.742 | 520.858 | 517.288 |

Note: *p<0.1; p<0.05; *p<0.01

FIG. 8

Table 2

FIG. 9

INTEGRATED AND INTERACTIVE CHAT SUITE

CROSS-REFERENCE TO RELATED APPLICATIONS

The present application claims priority to U.S. 63/210,303, filed Jun. 14, 2021, which is incorporated herein in its entirety.

TECHNICAL FIELD

The present disclosure is drawn to chat suites, especially integrated and interactive chat suites used, e.g., for online survey experiments or research.

BACKGROUND

The political significance of interpersonal speech has long been recognized, since the earliest scholars of political communication, who at the time lamented the difficulty of collecting the "systematic inventory" of interpersonal communication necessary for rigorous research. More recently, the rise of social media has greatly expanded the potential influence of mass political speech, and certain platforms have public APIs that make data collection much easier, facilitating observational studies that illuminate mass trends and patterns.

However, the inability to apply randomized manipulations on these platforms has badly hindered experimental research, which is necessary to test important causal mechanisms by which social-psychological factors give rise to these phenomena. Moreover, many platforms do not even provide API access to collect observational data. In particular, much communication in modern social networks occurs in private messaging apps like WhatsApp, iMessage, and Facebook Messenger, but it is difficult to study these interactions under controlled experimental conditions. Although a researcher could convene experiment participants to communicate via such apps, they are not designed for research purposes, creating difficulties at all stages of the research process, including recruitment, experimental treatment manipulation, and data collection.

BRIEF SUMMARY

A system may be provided that alleviates the above-referenced issues. The system may be a system for chat-based studies utilizing a plurality of users. The system may include a processor, such as at least one chat room processor, configured to perform certain tasks. This may be done, e.g., with instructions stored on a non-transitory computer readable medium that, when executed, cause the processor to perform the tasks. The tasks may include receiving a chat room template, where the chat room template includes one or more instructions and one or more questions or prompts for each chat room of a plurality of chat rooms. The tasks may include creating the plurality of chat rooms based on the chat room template. The tasks may include assigning participants to one chat room of the plurality of chat rooms, each participant being one of the plurality of users. The tasks may include, for each chat room, providing the one or more instructions associated with the chat room when all participants assigned to the chat room are present in the chat room. The tasks may include, for each chat room, providing the one or more questions or prompts associated with the chat room at times defined by the chat room template or when conditions defined by the chat room template are met. The tasks may include collecting all messages received from each participant. The tasks may include, for each message, storing information on a non-transitory computer readable storage medium, the information comprising the message, a time stamp the message was sent and/or received, and at least one unique identification code associated with the participant sending the message. The system may include a plurality of remote processors, including a first remote processor configured to perform certain tasks. This may be done, e.g., with instructions stored on a non-transitory computer readable medium that, when executed, cause the processor to perform the tasks. These tasks may include connecting a first participant to the system, the first participant having at least one unique identification code. These tasks may include providing a user interface for the first participant. These tasks may include receiving instructions from the at least one chat room processor and displaying the instructions to the first participant. These tasks may include receiving a first question or prompt from the at least one chat room processor and displaying the first question or prompt to the first participant, the first question or prompt from the at least one chat room processor being one of the one or more questions or prompts. These tasks may include receiving a message from another participant in a same chat room responsive to the first question or prompt and displaying the message to the first participant. These tasks may include receiving input from the first participant, the input being responsive to the first question or prompt, and the input being provided after the message from another participant has been displayed to the first participant. These tasks may include formatting the input as a message and sending the message to the chat room.

In some embodiments, sending the message to the chat room may include the first remote processor sending the message to the one or more chat room processors. In some embodiments, sending the message to the chat room may include the first remote processor sending the message to each participant. In some embodiments, sending the message to the chat room may include the one or more chat remote processors sending the message to each participant. In some embodiments, the chat room template may include a chat room group size, a target chat room demographic composition, and/or a duration.

In some embodiments, the one or more chat room processors may be configured to receive information from a researcher defining the chat room template, create the chat room template based on the received information, and store the chat room template in a database.

In some embodiments, the one or more chat room processors may be configured to ask each user one or more questions before determining which chat room the user should be assigned to as a participant, receive responses to the one or more questions, define demographic information about each participant based on the responses, and store the demographic information about each participant. In some embodiments, the one or more chat room processors may be configured to receive demographic information about each participant and determine which chat room a user should be assigned to as a participant, based on the demographic information and the chat room template.

In some embodiments, the one or more chat room processors may be configured to generate a unique uniform resource locator (URL) for participants to enter an assigned chat room. In some embodiments, the URL can be used on its own, or can be imported/integrated into another survey platform.

In some embodiments, the one or more chat room processors may be configured to place participants in a waiting room prior to being allowed to enter an assigned chat room. In some embodiments, the waiting room may show a number of participants waiting and a countdown timer and/or the waiting room may be configured to keep participants engaged while waiting by displaying one or more videos and/or allowing participants to play one or more games. In some embodiments, the one or more chat room processors may be configured to send at least some of the information stored on the non-transitory computer readable storage medium to a researcher. In some embodiments, the one or more chat room processors may be configured to receive input from a moderator while participants are sending messages in a chat room.

In some embodiments, the one or more chat room processors may be configured to ask questions to one or more participants. In some embodiments, the one or more chat room processors may be configured to engage in conversation with one or more participants. In some embodiments, the one or more chat room processors may be configured to mute or block a participant in the chat room. In some embodiments, a determination to mute or block a participant may be based on the input received from the moderator.

In some embodiments, the one or more chat room processors may be configured to generate a translated message by utilizing a trained machine learning algorithm to convert a message received from a participant from a first language to a second language, store the message and the translated message in a database, and send the translated message to all other participants in the chat room.

In some embodiments, the one or more chat room processors may be configured to perform a statistical analysis of the messages sent by participants in the chat room, and graphically display results of the statistical analysis.

In some embodiments, the first remote processor may be configured to filter messages sent by the first participant and/or received from other participants in the same chat room based on criteria defined by the first participant and/or the template. In some embodiments, the first remote processor may be configured to adjust displayed text based on criteria defined by the first participant related to a preferred language.

In some embodiments, each of the plurality of remote processors may be configured to provide an interface for each participant utilizing a web browser, wherein the one or more chat room processors are in a cloud-based server, or both.

BRIEF DESCRIPTION OF THE FIGURES

Figure 9:
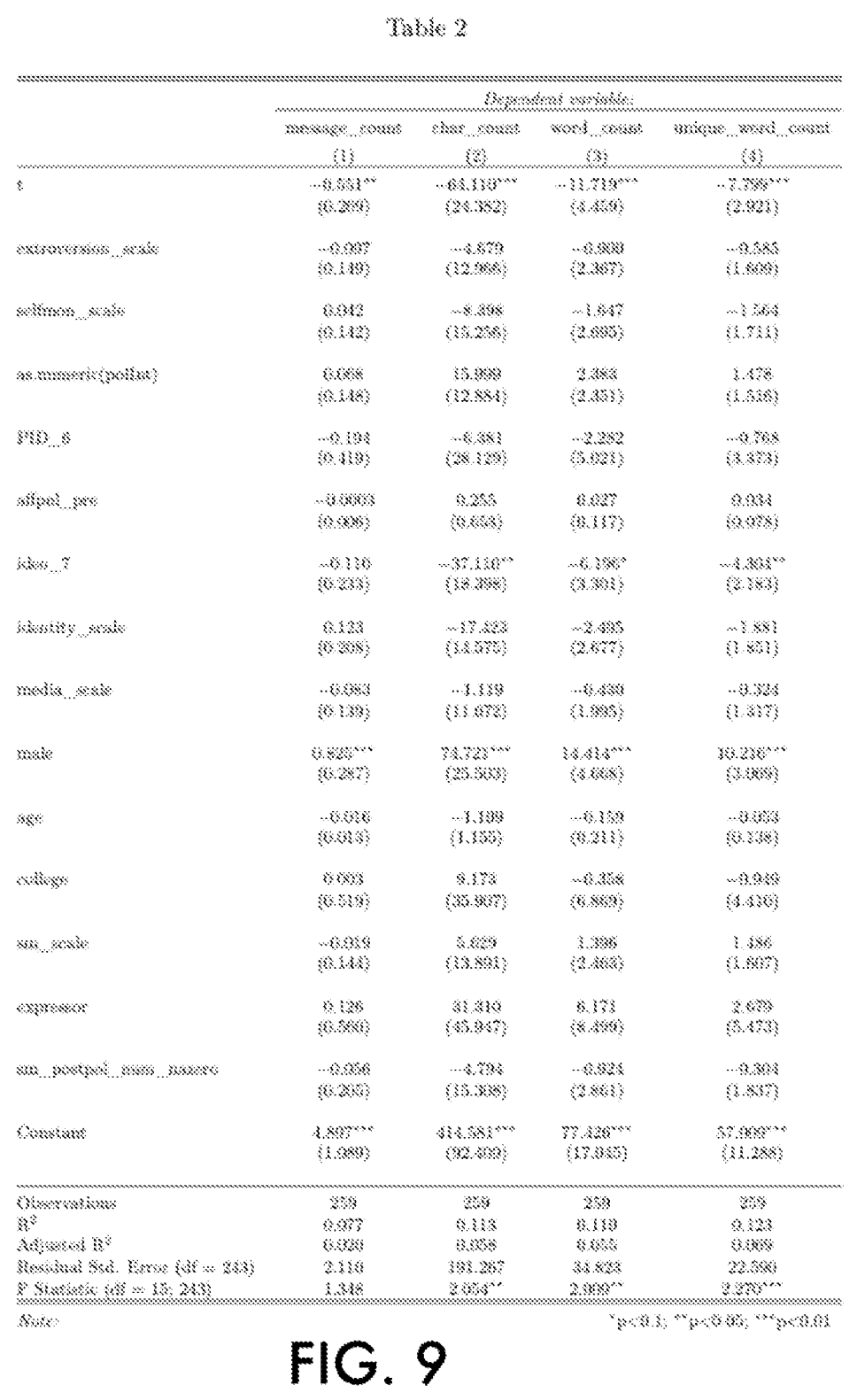

FIGS. 8 and 9 are tables showing analyses of data for an example study, relating to self-selecting (FIG. 8, referred to as Table 1) and speaking up in chats (FIG. 9, referred to as Table 2).

DETAILED DESCRIPTION

Figure 1:
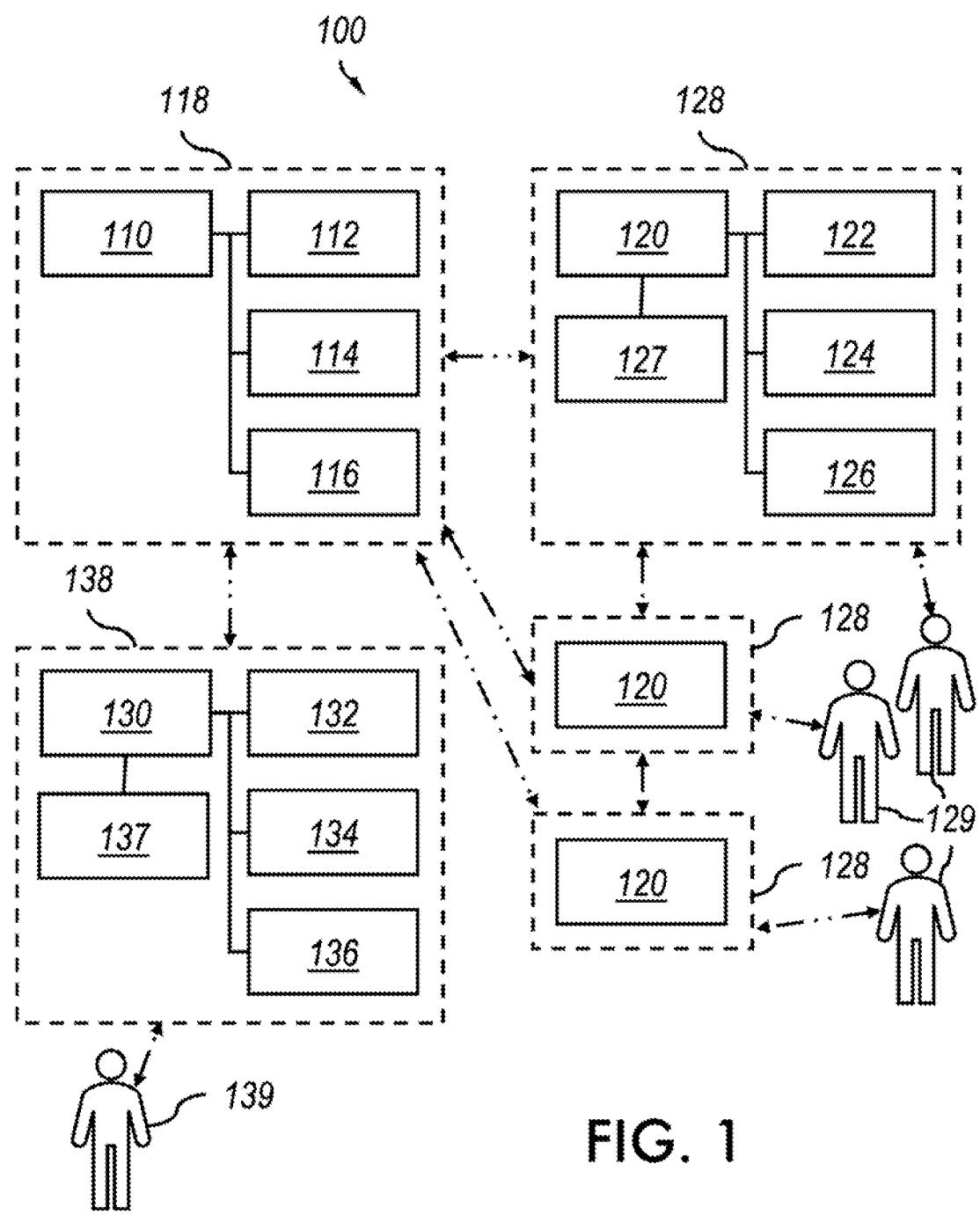
FIG. 1 is a block diagram illustrating components of embodiments of a disclosed system.

Embodiments of the present disclosure are described in detail with reference to the figures wherein like reference numerals identify similar or identical elements. It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Disclosed is an integrated and interactive chat suite, e.g., for online survey experiments, that represents a solution to the aforementioned problems, and that allows a researcher or administrator to rapidly scale up the gathering of data from appropriately selected participants in a controlled environment. The disclosed systems may be researcher-friendly online platforms for recruiting participants into chatrooms that can be manipulated by the researcher, allowing efficient management of large-scale chat studies that can shed light on the social dynamics of digital communication about which scholars often speculate but can rarely test.

The disclosed systems may be used by an individual researcher or research team to perform chat-based studies on any given topic. The systems may allow researchers to administer, monitor, and analyze live conversations. The systems may allow researchers to recruit participants directly into live chat rooms that can be embedded into, e.g., a commercially available survey platform, such as Qualtrics, or used as a stand-alone interface. The intelligent system may let researchers define instructions and questions to guide one or more chats, and configure additional options for any conversation with a participant. Using the various features provided by the system, researchers can define multiple chatroom templates to conduct multiple studies simultaneously.

Further, the system may allow significant aspects of the research process to be fully automated, requiring no research assistants to moderate discussions, and employing a dynamic waiting room system to place participants into chatrooms as they are recruited, obviating the need for scheduling chat sessions in advance (thus greatly reducing costly attrition).

In some embodiments, a system may be provided for such chat rooms.

Referring to FIG. 1, in some embodiments, the system 100 may include at least one processor 110. The at least one processor 110 may be configured as a chat room processor, configured to perform certain tasks. In some embodiments, the system may include a non-transitory computer readable storage medium 112, operably connected to the at least one processor 110. In some embodiments, the system may include a communication transceiver 114, operably connected to the at least one processor 110, and configured to use known wired and/or wireless communication techniques. In some embodiments, the at least one processor 110 may be present within a housing 118. In some embodiments, this may be the housing for a remote server, such as a cloud server.

The system may include a plurality of remote processors 120. Each remote processor 120 may be configured as a participant processor, configured to perform certain tasks, different from the tasks performed by the chat room processor. In some embodiments, each remote processor is within one of a plurality of remote devices 128. In some embodiments, each remote processor 120 may be operably connected to a non-transitory computer readable storage medium 122, one or more communication transceivers 124, and one or more displays 126. In some embodiments, each remote processor 120 may be operably connected to an input device 127 (e.g., keyboard, mouse, microphone, etc). Each remote processor may be configured to communicate with an assigned user 129. In some embodiments, the chat rooms may only allow participants to communicate via text. If a microphone is used, the remote processor may be configured to convert speech to text.

In some embodiments, each remote device is configured to communicate with the one or more chat processors 110. In some embodiments, each remote device 128 is configured to communicate with one or more other remote devices 128. In some embodiments, each remote device is configured to communicate with all other remote devices 128.

The system may include one or more additional processors 130. Each additional processor 130 may be configured as a researcher or administrator processor, configured to perform certain tasks, different from the tasks performed by the chat room processor or the participant processors. In some embodiments, each additional processor is within one of a plurality of researcher or administrator devices 138. In some embodiments, each additional processor 130 may be operably connected to a non-transitory computer readable storage medium 132, one or more communication transceivers 134, and one or more displays 136. In some embodiments, each additional processor 130 may be operably connected to an input device 137 (e.g., keyboard, mouse, etc). Each additional processor may be configured to communicate with an assigned administrator or researcher 139. In some embodiments, each additional processor may be configured to generate a user interface relevant to the chat rooms. For example, in some embodiments, a user interface for generating chat room templates is provided. In some embodiments, a user interface for interacting with the chat room processors while users are interacting in a chat room may be provided.

Chat Processors

The chat room processor(s) 110 may be configured to perform specific chat room tasks. In some embodiments, a non-transitory computer readable storage medium contains instructions that, when executed by the one or more chat room processors, causes the chat room processors to perform certain tasks. In some embodiments, the one or more chat room processors are in a cloud-based server.

Figure 2:
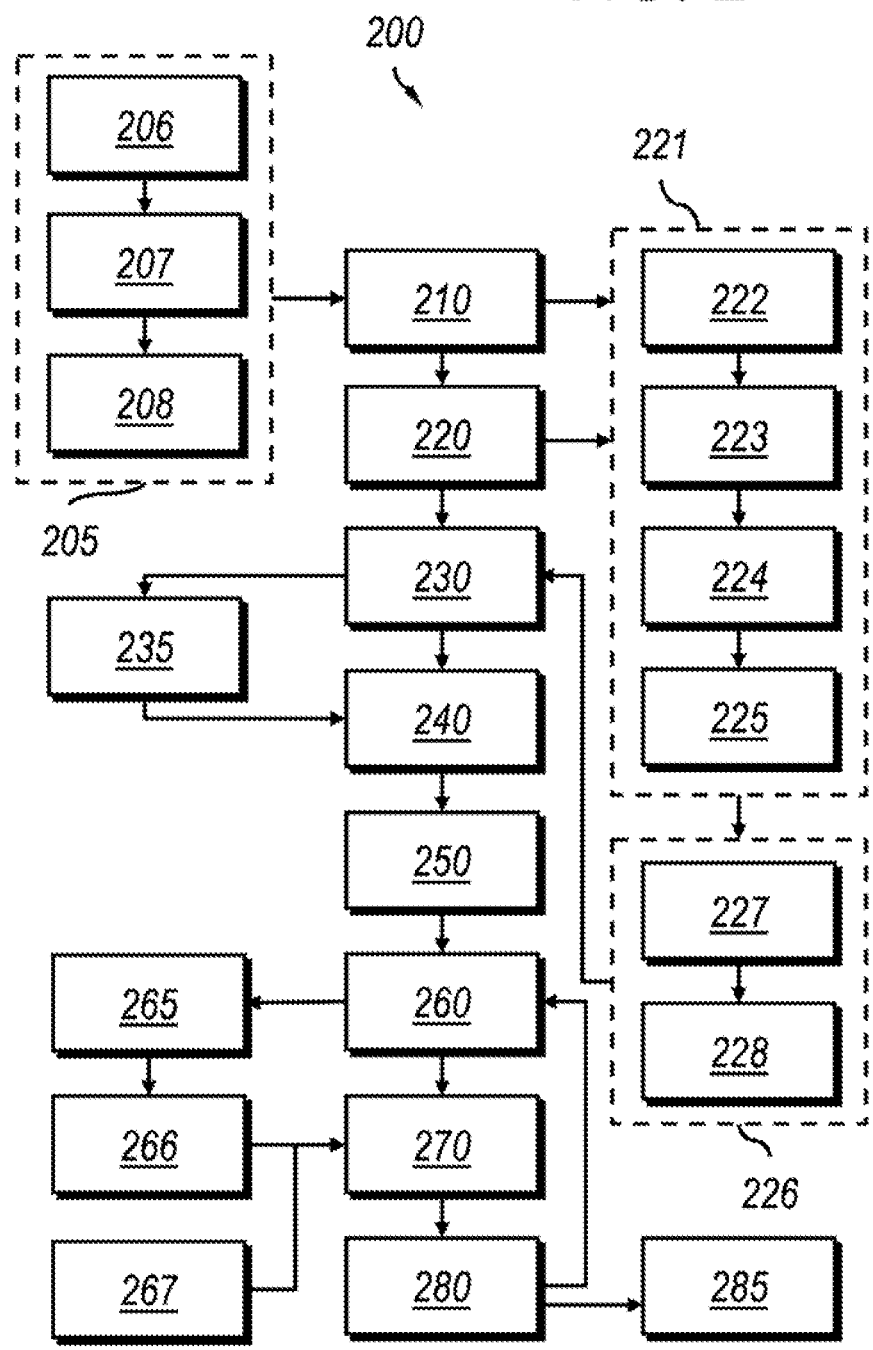
FIGS. 2 and 3 are flowcharts illustrating some approaches for configurating an embodiment of a chat room processor.

Referring to FIG. 2, in some embodiments, the tasks 200 performed by the chat room processor may include preparing 205 a template. In some embodiments, a template may by created by receiving 206 information from a researcher (e.g., information sent to the chat room processor 110 from a research or administrator processor 130), where the information defines the chat room template. The chat room processor can then create 207 the chat room template based on the received information. In some embodiments, the chat room processor can store 208 the chat room template in a database. In some embodiments, the preparation of a chat room template may be accomplished minutes, hours, days, weeks, and/or months before participants are ready to use a chat room.

In some embodiments, the template may include one or more chat room instructions. The instructions are intended to be presented to the participants after they have entered a chat room, and may describe, e.g., how or when questions will be asked, how or when participants need to respond, etc.

In some embodiments, the template may include one or more questions or prompts for each chat room of a plurality of chat rooms. In some embodiments, this may include timing information to indicate when the question or prompt should be presented to the chat room. In some embodiments, this may include one or more triggers that can be used to activate certain questions or prompts. For example, a template may include a question or prompt, associated with a trigger, where the trigger is a 1- or 2-word response from a participant following a particular question. When the chat room processor detects a participant responded to a question by answering "yes", the chat room processor would recognize it needed to ask a particular follow-up question to that participant.

In some embodiments, the template may also include a chat room group size. In some embodiments, this may include a minimum size. In some embodiments, this may include a maximum size. In some embodiments, this may include an exact size (e.g., exactly 2 people per chat room).

In some embodiments, the template may include a target chat room demographic composition. The demographic composition may include any characteristic that can be used to differentiate participants.

In some embodiments, the template may include a duration (e.g., a period of time). In some embodiments, the duration is a total duration each participant may be in the chat room. In some embodiments, the duration is a maximum duration, such as a maximum duration each participant is given to respond to a prompt or question. In some embodiments, the duration is a minimum duration, such as a minimum duration each participant must consider the question or prompt before interacting in the chat room, or a minimum amount of time that must be spent before asking another question.

When a researcher or administrator is ready, a template may be sent to the chat room processors, either from the database, or directly from the researcher or administrator. The one or more chat room processors may receive 210 the template. In some embodiments, the template may include, e.g., one or more instructions and one or more questions or prompts for each chat room of a plurality of chat rooms.

After the template has been received, the one or more chat room processors may then create 220 the plurality of chat rooms based on the chat room template. In some embodiments, this may include creating a virtual server, and running one or more scripts configured to allow the virtual chat room to operate.

At some point in time (shown in FIG. 2 as being after the templates are received or after the chat rooms are created), the chat room processors may perform additional steps intended to acquire 221 demographic information about one or more participants.

In some embodiments, acquiring demographic information may include sending (or asking) 222 each potential participant one or more questions before determining which chat room the potential participant should be assigned to as a participant.

In some embodiments, acquiring demographic information may include receiving 223 responses to the one or more questions from each potential participant.

In some embodiments, acquiring demographic information may include defining 224 demographic information about each participant based on the responses. In some embodiments, the chat room processor may use natural language processing to fit each provided response to a particular question into one of a set of predefined categories.

For example, if participants are asked a question such as "how old are you?" and a user responds "27", the chat room processor may then determine that the user is in a demographic category of "25- to 35-year-old people". Or, if asked who the user voted for in the last election, the chat room processor may take whatever the user responds, try to match it to the name of a politician, and determine which party the user voted for, defining that as a party affiliation.

In some embodiments, acquiring demographic information may include storing 225 the defined demographic information about each participant.

In some embodiments, after acquiring 221 demographic information, or if demographic information has already been gathered in other ways, the one or more chat room processors may be configured to determine 226 which users should be assigned to which rooms.

In some embodiments, the determination may include receiving 227 demographic information about each participant.

In some embodiments, it may include determining 228 which chat room a user should be assigned to as a participant, based on the received demographic information and the chat room template.

In some embodiments, the one or more chat processors may assign 230 participants to one chat room of the plurality of chat rooms, each participant being one of the plurality of users. Depending on the criteria defined by the chat room template, the assignments may be accomplished in a variety of ways. In some embodiments, assigning may include assigning one or more users from the entire set of users, or from a subset of users, randomly to one or more chat rooms. In some embodiments, assigning may include assigning one or more users to a chat room based on the defined demographics.

In some embodiments, the one or more chat room processors may generate 235 a unique uniform resource locator (URL) for one or more participants to enter an assigned chat room. In some embodiments, this URL can be used on its own, by a user, using, e.g., a web browser, to access the chat room. In some embodiments, this URL can be integrated into a commercially available survey platform (such as the online survey platform offered by Qualtrics), to allow users to access the chat room from the survey platform.

In some embodiments, the one or more chat room processors may place 240 participants in a waiting room prior to being allowed to enter an assigned chat room.

In some embodiments, the waiting room may show a number of participants waiting and a countdown timer. In some embodiments, the waiting room may be configured to keep participants engaged while waiting by displaying one or more videos and/or allowing participants to play one or more games. In some embodiments, the waiting room may show a number of participants waiting and a countdown timer, and the waiting room may be configured to keep participants engaged while waiting by displaying one or more videos and/or allowing participants to play one or more games.

In some embodiments, the one or more chat room processors may, for each chat room, provide 250 the one or more instructions from the chat room template that are associated with the chat room when all participants assigned to the chat room are present in the chat room. In some embodiments, this is accomplished using a chat bot operating on the one or more chat room processors.

In some embodiments, the one or more chat room processors may, for each chat room, provide 260 the one or more questions or prompts from the chat room template that are associated with the chat room at times defined by the chat room template or when conditions defined by the chat room template are met. The template may define whether one or more questions are asked at the same time—for example, (i) is a single question asked, and then a response from the participants required or expected; or (ii) are more than one questions asked together, and the participants then allowed to discuss the various questions amongst themselves. The chat room template may include a plurality of types of questions (e.g., open-ended questions, multiple choice questions, ordinal scale questions, interval scale questions, and/or ratio scale questions).

In some embodiments, this is accomplished using a chat bot operating on the one or more chat room processors. In some embodiments, each question in the template is given a specific time to be asked. For example, the template may define that question 1 be asked immediately after the instructions are presented, question 2 be asked 3 minutes later, and question 3 be asked 7 minutes after question 2. In some embodiments, each question or prompt in the template may be given criteria which may or may not be met during the chat room. For example, the template may indicate that if specific words are said, it triggers a particular prompt. Or, if the chat room processor determines that one user is dominating the chat, while a second user is barely providing input, it may trigger a prompt thanking the first user, and then specifically asking the second user for their feedback.

In the chat rooms, at least some of the time the participants will be allowed to send messages to the chat room, which can be displayed to all participants.

In some embodiments, the one or more chat room processors may receive 265 input from a moderator (e.g., moderator 139, using additional processor 130) while participants are sending messages in a chat room.

In some embodiments, the one or more chat room processors may mute or block 266 one or more participants in the chat room based on the input received from the moderator.

In some embodiments, the one or more chat room processors may operate 267 a chat bot that interacts with the participants and may be configured to masquerade as a human being. For example, in some embodiments, the chat bot may be configured with a natural language processor that is configured to form responses in a particular manner as defined in the template. In some embodiments, the chat bot may be configured to act on behalf of the researcher or moderator. In some embodiments, the chat bot may be configured to act as a participant. In some embodiments, the chat bot may use a machine learning algorithm that has been trained to respond to chat messages using, e.g., aggressive language, thoughtful language, etc., as directed in the template.

The chat bot may, e.g., give instructions. In some embodiments, the stating of the instructions may be the step of providing 250 the one or more instructions to the chat room. That is, the instructions from the chat room template may be presented to the chat room in step 250 by the chat bot.

The chat bot may, e.g., ask questions. In some embodiments, the asking of these questions may be the step of providing 260 the one or more questions or prompts to the chat room. That is, the questions or prompts from the chat room template may be presented to the chat room in step 260 at appropriate times by the chat bot.

In some embodiments, the chat bot may be used to mute and/or block participants at appropriate times (step 265).

In some embodiments, the chat bot may say things to the chat room intended to come across as if the chat bot were a live person. In some embodiments, the chat bot may be configured to discuss topics separate from whatever topic the chat room is designed to gather information from the participants about.

In some embodiments, the one or more chat room processors may collect 270 all messages received from each participant.

In some embodiments, the one or more chat room processors may, for each message, store 280 information on a non-transitory computer readable storage medium, where the information comprising the message, a time stamp the message was sent and/or received, and at least one unique identification code associated with the participant sending the message.

In some embodiments, the one or more chat room processors may send 285 at least some of the information stored on the non-transitory computer readable storage medium to a researcher (e.g., sending the information to additional processor 130 that is associated with research 139).

Figures 3, 4:
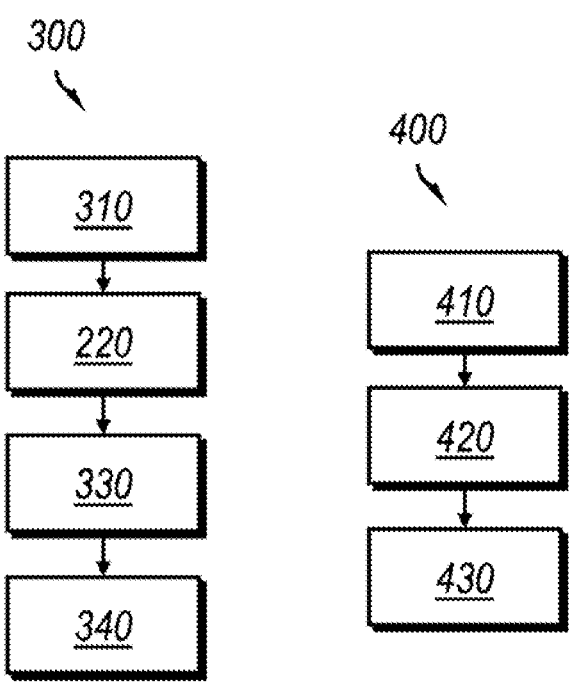
FIG. 4 is a flowchart illustrating an approach for configurating an embodiment of a chat room processor and/or an additional processor.
Figure 5:
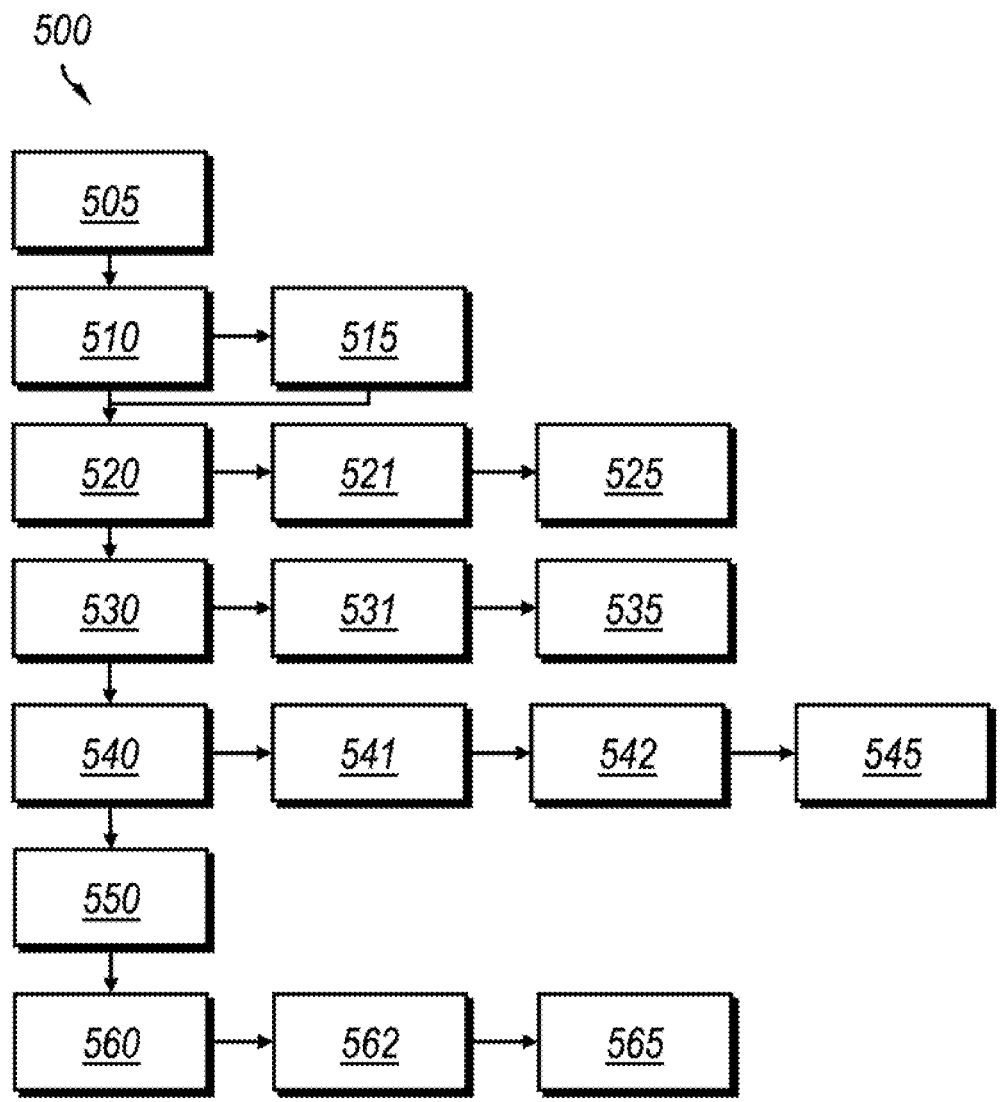
FIG. 5 is a flowchart illustrating an approach for configurating an embodiment of a remote processor.

Referring to FIG. 3, in some embodiments, the one or more chat room processors may be configured to handle translations. In some embodiments, a translation 300 may include first receiving 310 a message from a user, where the message contains one or more words in a first language.

The chat room processors may then generate 320 a translated message by utilizing a trained machine learning algorithm to convert either specific words, or the entire received message, from the first language to a second language different from the first language. In some embodiments, each participant may select a preferred language, and the second language will be the preferred language for each participant.

In some embodiments, the one or more chat room processors may store 330 the message and the translated message in a database (e.g., on non-transitory computer-readable storage medium), and may store a date and/or time stamp, and at least one unique identification code associated with the participant sending the message. In some embodiments, at least one unique identification code associated with the participant receiving the translated message may also be stored.

In some embodiments, the one or more chat room processors may send 340 the translated message to one or more (or all) participants in the chat room. This step may occur before, after, or concurrently with the storing 330 step.

In some embodiments, the one or more chat room processors, or one or more additional processors, may receive 410 some or all of the messages sent in one or more chat rooms. In some embodiments, the messages may be accessed from a database.

In some embodiments, these processor(s) may perform 420 a statistical analysis of the messages. In some embodiments, the processor(s) may perform the statistical analysis on all messages sent by all participants in all chat rooms. In some embodiments, the processor(s) may perform the statistical analysis on all messages sent by all participants in one chat room. In some embodiments, the processor(s) may perform the statistical analysis on all messages sent by one participant in one or more chat rooms.

In some embodiments, these processor(s) may then graphically display 430 results of the statistical analysis.

The chat room processors may continue asking questions (e.g., step 260), and allowing chat to occur in response to those questions, based on the template. In some embodiments, as disclosed herein, the template may be configured to end the chat room (i) after a predetermined period of time; (ii) after a chat bot has asked all of the questions in the template, and a predetermined period of time has passed to allow the participants to chat in response to the last question; or (iii) a combination of (i) and (ii) (e.g., after all questions have been asked and responded to unless the chat session lasts longer than 10 minutes).

Remote Processors

The remote processor(s) 110 may be configured to perform specific tasks on a remote device utilized by a participant. In some embodiments, a non-transitory computer readable storage medium contains instructions that, when executed by one or more remote processor, causes the remote processors to perform certain tasks. In some embodiments, the first processor may include a first remote processor utilized Referring to FIG. 2, in some embodiments, the remote processor(s) may connect 505 participants to the system. Each participant may have at least one unique identification code. In some embodiments, the remote processor(s) may include a first remote processor configured to connect a first participant to the system, the first participant having at least one unique identification code.

In some embodiments, the remote processor(s) may connect 510 a participant to a chat room and/or a waiting room.

In some embodiments, the remote processor(s) may provide 515 a user interface for each participant. In some embodiments, the remote processor(s) may provide a first user interface when the user is in a waiting room, and a second user interface with the user is in a chat room. In some embodiments, each of the plurality of remote processors is further configured to provide a user interface for a participant utilizing a web browser.

In some embodiments, the remote processor(s) may receive 520 instructions from at least one chat room processor.

In some embodiments, the remote processor(s) may adjust 521 text to be displayed based on criteria defined by the first participant related to a preferred language or format. For example, in some embodiments, the remote processor(s) may include natural language processing to convert instructions from a first language to a second language. In some embodiments, the remote processor(s) may adjust the intended color, font, or size of the associated instructions to be displayed based on criteria from the user.

In some embodiments, the remote processor(s) may display 525 the instructions to a participant. The timing for receiving and/or displaying the instructions may be variable. In some embodiments, the instructions may be received before the user enters a chat room. In some embodiments, the instructions may be received after the user enters a chat room. In some embodiments, the instructions may be displayed before the user enters a chat room. In some embodiments, the instructions may be displayed after the user enters a chat room.

In some embodiments, the remote processor(s) may receive 530 a first question or prompt from the at least one chat room processor.

In some embodiments, the remote processor(s) may adjust 531 text to be displayed based on criteria defined by the first participant related to a preferred language or format. For example, in some embodiments, the remote processor(s) may include natural language processing to convert questions or prompts from a first language to a second language. In some embodiments, the remote processor(s) may adjust the intended color, font, or size of the associated question or prompt to be displayed based on criteria from the user—for example, certain users may be in certain colors and sizes, etc. In some embodiments, the questions or prompts may be highlighted or otherwise specially formatted to ensure the participant is aware of the text.

In some embodiments, the remote processor(s) may display 535 the first question or prompt to a participant, the first question or prompt from the at least one chat room processor being one of the one or more questions or prompts from the chat room template.

The participants may then chat and interact, sending messages to the room/other participants in the room.

In some embodiments, the remote processor(s) may receive 540 a message originating from another participant in a same chat room responsive to the first question or prompt.

In some embodiments, the remote processor(s) may adjust 541 text to be displayed based on criteria defined by the first participant related to a preferred language or format. For example, in some embodiments, the remote processor(s) may include natural language processing to convert messages from a first language to a second language. In some embodiments, the remote processor(s) may adjust the intended color, font, or size of the associated messages to be displayed based on criteria from the user.

In some embodiments, the remote processor(s) may filter 542 messages received from other participants in the same chat room based on criteria defined by the receiving participant and/or the chat room template. For example, in some embodiments, all predefined curse words are replaced with asterisks.

In some embodiments, the remote processor(s) may display 545 the received message to the first participant. As disclosed herein, this may be a message as written by the other participant, or the message may have been processed by the one or more chat room processors.

In some embodiments, the remote processor(s) may receive input 550 from a participant (e.g., the first remote processor may receive input from the first participant). The input may be responsive to a recent question or prompt (such as the most recent question or prompt) that has been sent to the room (e.g., the first question or prompt sent by a chat room processor), and/or responsive to input from another participant. The input may be provided after a message from another participant has been displayed.

In some embodiments, the remote processor(s) may format 560 the input as a message.

In some embodiments, the remote processor(s) may filter 562 messages from the participant before being sent out to the chat room, based on criteria defined by the sending participant and/or the chat room template. For example, in some embodiments, the sending user may have configured the system to replace the phrase "TY." with "Thank you."

In some embodiments, the remote processor(s) may send 565 the message to the chat room. In some embodiments, it is sent to the chat room processor(s), and the chat room processor(s) then send the message to the participants in the room. In some embodiments, the messages may be sent directly to the other participants.

In some embodiments, the system may include a chat characterization engine configured to receive input from a participant, determine if the input is in a target language (and if not, translate the received input to the target language), and determine at least one characteristic of the input (or translated input). The determination may be based on previous inputs from the participant or other user. For example, in some embodiments, by analyzing word selection in the input, the system may determine a received input was directed at the prior user (characteristic 1), but also related to the supplied question (characteristic 2), and written using a passive voice (characteristic 3). Alternatively, the characteristics may include, e.g., the estimated reading grade level of the input, and/or whether the input repeats some term used by another participant. In some embodiments, those characteristics are then used to make further determination or in further analysis work. For example, in some embodiments, those characteristics may be used to assign rooms to participants (e.g., a researcher may want to only select people who tend to speak with active voices, or may want to avoid mixing people who use grade 12 language with people who are using grade 3 language). In some embodiments, those characteristics are saved as metadata along with the message itself. In some embodiments, the characteristics are used to flag issues for a moderator to be aware of (for example, if a participant is routinely identified as responding to another participant, using language not relevant to the question asked, and using an active voice, it may be flagged as possible aggressive speech that might be worth reviewing and/or censoring, and may include removing the participant from the chat room.

Example

The political significance of interpersonal speech has long been recognized, since the earliest scholars of political communication, who at the time lamented the difficulty of collecting the "systematic inventory" of interpersonal communication necessary for rigorous research. More recently, the rise of social media has greatly expanded the potential influence of mass political speech, and certain platforms have public APIs that make data collection much easier, facilitating observational studies that illuminate mass trends and patterns.

However, the inability to apply randomized manipulations on these platforms has badly hindered experimental research, which is necessary and beneficial to test (1) how interpersonal communication affects people's attitudes and behaviors, (2) what the important causal mechanisms by which social psychological factors affect interpersonal communication, and (3) how discussion group compositions and procedures affect deliberation results.

Moreover, many social media platforms do not even provide API access to collect observational data. In particular, much communication in modern social networks occurs in private messaging apps like WhatsApp, iMessage, and Facebook Messenger, but it is difficult to study interpersonal communications under controlled experimental conditions. Although researchers could convene experiment participants to communicate via such apps, or in-person (more traditionally), they are not designed for efficient experimental designs, creating difficulties at all stages of the research process, including participants recruitment, experimental treatment manipulation, group composition manipulation, data collection, and data exportation.

An online platform, named ReChat, was developed as a solution. ReChat is an integrated and interactive chat tool for researchers to explore interpersonal communications at large scale online, with automated features and tools to facilitate the research process.

More specifically, ReChat is a researcher-friendly online platform for recruiting participants into chatrooms that can be manipulated by the researcher, allowing efficient management of large-scale chat studies that can shed light on the social dynamics of digital interpersonal communications about which scholars often speculate but can rarely test.

ReChat can be used by an individual research or research team to perform chat-based studies on any given topics. It allows researchers to administer, monitor, and analyze live conversations. ReChat allows researchers to recruit participants directly into live chat rooms that can be embedded in a Qualtrics survey, or used as a stand-alone interface. The ReChat suite lets researchers define instructions and questions to guide the chat, and configure additional options for the conversation.

Using the various features provided by the ReChat suite, researchers can define multiple chatroom templates to conduct multiple studies simultaneously. Moreover, ReChat allows significant aspects of the research process to be fully automated, requiring no research assistants to moderate discussions, and employing a dynamic waiting room system to place participants into chatrooms as they are recruited, obviating the need for scheduling chat sessions in advance, (thus greatly reducing costly attrition).

Features of ReChat

ReChat has a simple account creation process for researchers. To use the ReChat platform, researchers are asked to enter some basic information to create their accounts on a dedicated website for that purpose. Once the administrator of ReChat platform approves the account, the researcher can start to use the ReChat platform.

ReChat currently supports English and Chinese. Researchers can change the language easily from their account dashboards.

Researchers can create multiple chat room templates with features suit their research purposes. For example, researchers can set whether they want to end chat sessions as expiration of time or when all questions have been discussed in the chat session.

Researchers can set the expiration time for the chat session.

Researchers can create and pre-define the questions/prompts participants will discuss in the chat session.

Researchers can set the maximum number of participants they want to assign to each chat session.

Researchers can set screening questions before. Based on the responses of the screening questions, the participants can be assigned to different chat rooms.

Researchers can set up a waiting room for the participants. After participants join the chat while waiting for being assigned to a chat session, researchers can easily set different configurations of the waiting room. First, researchers configure a welcome message (which may include, e.g., text and/or an image) that will be shown to the participants in the waiting room. Second, researchers can assign videos and games for participants to watch and play while they are in the waiting room.

Researchers can set the maximum amount of time participants will be placed in the waiting room, all participants will be moved to the live chatroom once the waiting time is over.

Researchers can choose the option to let intelligent bots presents instructions/questions one by one to the participants in a way pre-structured by the researchers.

During chat sessions, participants can type their messages and/or select answers from multiple choice questions. Participants can also see aggregate responses to the multiple choice questions.

Researchers can set the function to filter (i.e. not shown to other participants) any offensive words written by participants during chat sessions.

Researchers can set if a one-minute time left reminder will be shown to the participants before the chat session is going to be expired.

Researchers can join any live chat rooms from the admin panel. If needed, researchers can mute, unmute, or block a participant. Researchers can also send private messages to any particular participants.

Once the chat sessions end, researchers can download the entire chat transcripts, including the nicknames of the participants, questions asked during the chat sessions, responses from the participants, timestamps, etc. to analyze.

Previous chat transcripts, or a modified version of previous chat transcripts, can be uploaded and used in new chat sessions. In the new chat sessions, all messages conveyed by previous participants may now be sent out by bots but appear as real participants to new respondents.

Thus, in some embodiments, a chat transcript is saved. In some embodiments, the saved transcript may modified to enable the response to be used by a chat bot to masquerade as a human response. In some embodiments, that may be accomplish by, e.g., (i) determining a question or an identifier representative of the question, (ii) identifying a complete response to from a single participant to the question; (iii) removing any chat usernames from the response and optionally any associated text with those usernames, or replacing such with appropriate wording. For example, if a participant had responded to a question with "I agree with A that the answer is X, Y, and Z", this text may be modified to "I think that the answer is X, Y, and Z", by removing username "A", and replacing the associated text "agree with" with the appropriate word "think". In some embodiments, these modified responses are saved in a database, along with the question for which they are appropriate or an identifier associated with that question.

A Walk-Through of how ReChat Works

Figure 6:
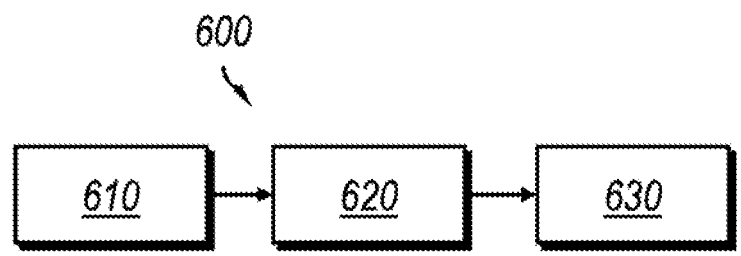
FIG. 6 is a study flow diagram for an embodiment of the system.

Referring to FIG. 6, a standard study using ReChat is structured as an experimentally-manipulated online chat, bookended by surveys. That is, chat experiments 600 typically consist of a pre-survey 610 (such as a recruitment survey), a text-based chat 620, and a post-survey 630 (such as an endline survey).

Note that ReChat can be embedded within the workings of another survey platform (such as a Qualtrics survey), streamlining this process such that participants complete the entire study within a single browser window.

The chat itself can be used to simulate various social interactions, exert persuasive influence, and elicit speech that can be analyzed using various text analysis methods, while the surveys are important for measuring predictors and moderators of chat behavior, for estimating attitude change that may be attributed to the chat, and (in some designs) for allocating participants to chat groups in the first place on the basis of pre-chat attitudes and traits.

Figure 7:
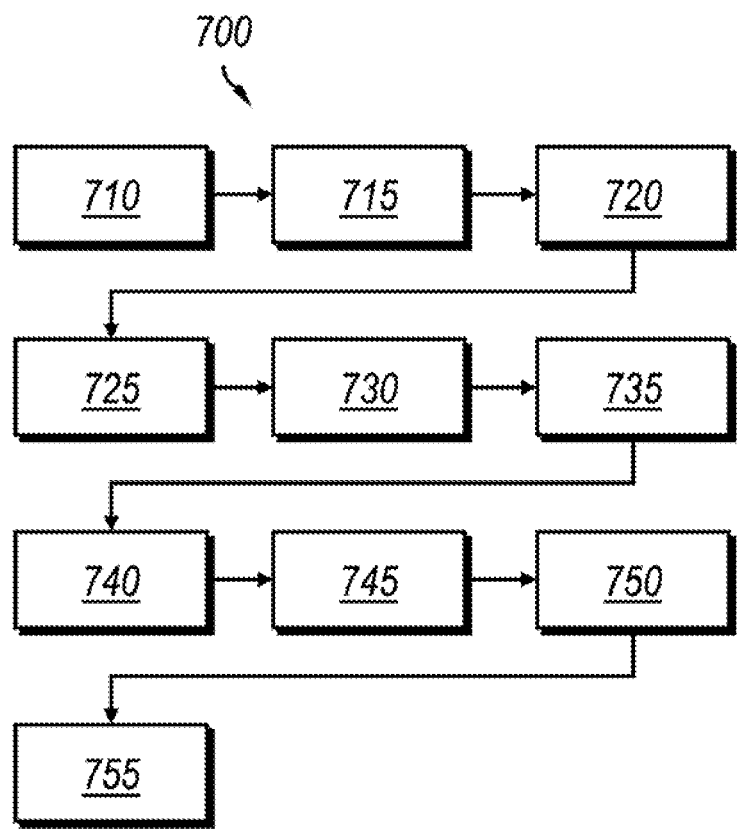
FIG. 7 is a flow chart for an embodiment of the system.

Referring to FIG. 7, it can be seen how—in this example—an embodiment of the system may work. In FIG. 7, the method 700 includes ten steps. In Step 1 (710), Researchers create a ReChat account by registering at a predefined website. In Step 2 (715), a ReChat administrator approves the account and sends the login details to the researchers' email. In Step 3 (720), Researchers log in to the ReChat platform. In Step 4 (725), Researchers create chat room template(s) and questions participants will discuss in chat sessions. In Step 5 (730), a URL will be generated for each chat room template that can be used to start the chat session. (The URL can be used in a browser or be embedded in a survey site like Qualtrics). In Step 6 (735), participants use the URL, and as the participants start to join the chat, they will be placed in the waiting room, until they are eventually let into a chat room. In Step 7 (740), once participants are placed into a chat room, an intelligent bot greets all participants and asks questions one by one according to how researchers pre-structured them. In Step 8 (745), The intelligent bot captures all messages participants texted. In step 9 (750), Researchers have the option to join any chat rooms from the ReChat platform anytime during the chat sessions. Researchers can participate in the chat, mute or unmute any participant, block any participant, or message privately to any participant. Finally, in step 10 (755), after all chat sessions are completed, researchers can download the chat transcripts and analyze the interactive data.

Example Implementation

To explore how ReChat performs, an example study was conducted, and fielded using the ReChat platform. The study recruited Democratic-identifying MTurkers to participate in a 5-minute dyadic (that is, two-person) political chat. Participants were not forewarned of the specific topic of the chat until the chat began, and a bot moderator posed the discussion question, "Who do you think is more hypocritical, Democrats or Republicans?" This prompt was designed in the template to give participants an opportunity to express as much or as little partisan antipathy as they chose, using a trait (hypocrisy) that has been the subject of previous studies of affective polarization.

Recruitment Procedure

To initiate chats in real time, it is necessary to recruit a large number of participants in a short time period, in order to bring participants into the chat waiting rooms simultaneously and thus place people into chatrooms together. In order to achieve this rapid entry of participants into waiting rooms, these studies were run using Amazon Mechanical Turk, which has a large number of workers online who can quickly join a study. In order to maximize recruitment opportunities, these studies were fielded at times when many workers are active—particularly in the early afternoon, Eastern Time.

Furthermore, recruitment was conducted through Cloud-Research1, which is a platform that provides various tools to augment studies run on Amazon Mechanical Turk. In particular, the HyperBatch feature was employed, which effectively launches the study and advertises it in several small batches that are published simultaneously or in rapid succession, increasing the number of participants who can be recruited in a short time span.

Once participants are recruited, they enter a survey, which measures key variables (discussed below), and invites them to participate in a two-person chat. Those who agree to a chat proceed to a page of the survey where ReChat is embedded as an iframe: participants are asked to enter a nickname, and are then placed in a waiting room until a partner arrives to chat with them (due to the above recruitment procedure, the waiting time is very brief). Once a partner arrives, the two participants are place in a chat together for 5 minutes, after which they receive a chat completion code, which they enter into the survey to verify their chat participation, and proceed to a final part of the survey which asks several more questions. Participants then exit the study.

Experiment Design and Measures

To incentivize participants to engage in a thorough discussion in their chat, participants were informed that their messages would be judged for their "thoroughness" and that participants with above average thoroughness would receive an additional monetary bonus. Although participants were indeed bonused for especially thorough discussions, an experimental manipulation was embedded in this incentive: the description of the thoroughness judges was manipulated to state either that participants' messages would be judged by "Democratic political analysts" or "neutral political analysts." This was intended to simulate accountability to different groups: accountability to a co-partisan group (since all participants were Democrats), or accountability to a neutral group. We analyzed the effects of this treatment on several outcomes, discussed further below.

Additionally, several key political, psychological, and demographic variables were measured that were expected to be relevant. Political variables measured before the chat included political interest, news and social media use, partisanship, ideology, and strength of social identification as a liberal or conservative (using the measure developed by Huddy, Mason and Aarøe, 2015). After the chat, each participant was asked to guess the ideology of their partner, on the same 7-point scale used to measure their own ideology. Both before and after the chat, partisan affective polarization was measured using two "feeling thermometers" to collect participants' subjective feelings of warmth towards Democrats and Republicans—warmth-towards-Republicans was subtracted from warmth-towards-Democrats to derive a measure of participants' affective favoritism of Democrats over Republicans. Because affective polarization was measured both before and after the chat, one can observe change in affective polarization that may be attributable to the chat.

Two main psychological variables were measured before the chat: extroversion and self-monitoring. Extroversion was of interest because chatting is a social activity, and therefore people may self-select into participating on the basis of their appetite for social interactions. Extroversion (using an instrument adapted from Ashton and Lee, 2009) was measured to characterize self-selection on this psychological trait. Additionally, self-monitoring (using the brief measure recommended by Berinsky and Lavine, 2011) was measured, which is a trait reflecting individuals' inclination to adjust their behavior to fit in with their social environment. This was of theoretical interest as a potential moderator of social conformity during the chat.

Key demographic variables were measured after the chat, including age, gender, and education.

Results

Who Self-Selects into Chatting about Politics?

One important question of recruiting participants to join online interpersonal communication studies concerns the factors that shape self-selection into participating in online chats with strangers about politics. This affects the pool of participants we can recruit into chats in the first place, and so represents an important starting point for our analysis. The predictors of chat participation were analyzed in a logistic regression framework, as well as asking those who refused to participate to describe why not, in their own words, for example: "First of all I am shy and also discussions about politics never yield any results"; "I worry about being able to carry the conversation well, and the anxiety was not worth the potential bonus to me"; "I'm a shy person online and in real life. I don't feel like I have anything insightful to add to a conversation"; and "I just really don't want to interact with others. I don't want to talk about politics either, its such a drag now."

Turning to the quantitative analysis, and considering psychological traits first, extroversion and self-monitoring are each found to be significantly predictive of self-selection into chat participation (see Table 1 (FIG. 8) columns 1 and 2). Selection on extroversion was expected, since extroverts were expected to be more willing to engage in an unplanned social interaction with a stranger. Selection on self-monitoring was not expected, but it is plausible that this trait is associated with social skills that make it easier or more comfortable to participate in a chat. Extroversion and self-monitoring were correlated (Pearson's ρ=0.36), and when both variables are included in the model, only extroversion retained significance. Note that neither variable retained significance in the fully-saturated models. However, the importance of extroversion is robustly evident in the free-responses given by those who refused to participate (see above).

Among the political variables measured, only political interest was a significant predictor of chat participation, as one would expect given that the only information participants had about the chat was that it would be about politics, and that their partner would be a fellow Democrat. Note that because all participants were Democrats (and therefore were generally also liberal), the lack of significant relationships between participation and partisanship, ideology, and related variables should be interpreted in terms of strength of partisanship and extremity of ideology. From these data one can make no claims about liberal-conservative or Democratic-Republican asymmetries in participation.

Considering the demographic characteristics we measured, it is found that college education is the largest and most statistically-significant predictor of chat participation. This may reflect that education confers skills and resources (Schlozman, Verba and Brady, 2012) that are useful for a political conversation, and so people with less education are less comfortable participating in such a conversation. This is consistent with a number of free-responses from people who refused to participate, who cited concerns about "being able to carry on the conversation well," and not having "anything insightful to add to a conversation." Apart from education, the only demographic factor predictive of participation was age, however this was not robust to alternative specifications.

Finally, a large and significant relationship was found between chat participation and using social media to express one's political views (this binary variable was constructed by asking participants whether they used various social media platforms, and then asking whether they used any to express their political view). This is sensible, since participating in a chat about politics is in many ways similar to expressing one's political views on social media. This also bolsters confidence in using ReChat to study research topics related to political expression on social media, since the people who agree to participate in ReChat studies tend to be the same people who talk about politics on social media (which enhances external validity).

In summary, self-selection into chat participation appears to follow sensible patterns: the people who agree to participate are more extroverted, interested in politics, and educated than those who do not, and they tend to be the same types of people who express their political views on real social media platforms.

Who Speaks Up in the Chats?

To characterize the extent of participation within chats, several measures of loquaciousness for each participant were constructed: number of messages sent in the chat, total character count, total word count, and total unique word count. Table 2 presents results with each of these metrics as the dependent variable. These analyses are based on linear regression with robust standard errors clustered at the level of the chatroom.

First, for all metrics apart from message count, a significant correlation was observed between=loquaciousness and ideology: liberals used significantly more characters and words than moderates. Since only liberal Democrats were included in this analysis, this implies that extremists are more loquacious than moderates—at least when the topic of conversation is partisan hypocrisy. This finding is particularly noteworthy because it is consistent with the accumulating evidence indicating that the polarization of online political discourse is attributable to the most extreme individuals being the most expressive, effectively distorting the sample of opinions that are presented online to be excessively extreme.

Furthermore, a significant gender effect was observed: compared to participants who identified their gender as female or non-binary, those who identified as male sent 0.8 more messages, used 75 morecharacters, and said 14 more words and 10 more unique words. This is consistent with previous findings of gender differences in participation in political discussions, replicating and extending this finding to online chats.

Finally, a strong negative treatment effect was observed: compared to control participants, on average treated participants sent 0.5 fewer messages, using 64 fewer characters, 12 fewer words, and 8 fewer unique words. This suggests that having one's thoroughness evaluated by a neutral party (the control condition) induced significantly greater thoroughness than being evaluated by co-partisans (the treatment condition). This makes sense, since a neutral observer would be expected to have a higher standard of what qualifies as a "thorough" discussion of whether Democrats or Republicans are more hypocritical, while a Democratic partisan evaluator might well be satisfied with a narrower set of considerations. This has implications for the thoroughness bonus as an incentive to be more talkative: clearly, the partisanship of the evaluator significantly moderates the effectiveness of this bonus.

Overall, it is found that talkativeness in the chats is consistent with ideological factors that have been identified in the social media literature, and gender dynamics that have previously been reported in the deliberation literature. Additionally, this example adds the novel finding that co-partisan accountability induces considerably less talkativeness than "neutral" accountability—a finding that has both practical implications for researchers seeking to increase engagement in the chatrooms they convene for data collection purposes, and that also potentially has broader theoretical implications for speech on social media platforms, where users may anticipate being held accountable for their speech primarily by co-partisans.

Those skilled in the art will recognize or be able to ascertain using no more than routine experimentation many equivalents to the specific embodiments of the invention described herein. Such equivalents are intended to be encompassed by the following claims.

What is claimed is:

1. A system for chat-based studies utilizing a plurality of users, the system comprising:
   at least one chat room processor configured to:
      create a plurality of chat rooms based on a chat room template, the chat room template including one or more instructions and one or more questions or prompts for each chat room of a plurality of chat rooms;
      assign participants to one chat room of the plurality of chat rooms, each participant being one of the plurality of users;

for each chat room, provide the one or more instructions associated with the chat room when all participants assigned to the chat room are present in the chat room; and for each chat room, provide the one or more questions or prompts associated with the chat room at times defined by the chat room template or when conditions defined by the chat room template are met.

2. The system of claim 1, wherein the at least one chat room processor is further configured to:

collect all messages received from each participant; and for each message, store information on a non-transitory computer readable storage medium, the information comprising the message, a time stamp the message was sent and/or received, and at least one unique identification code associated with the participant sending the message.

3. The system of claim 1, further comprising a plurality of remote processors, including a first remote processor configured to connect a first participant to the system, the first participant having at least one unique identification code.

4. The system of claim 3, wherein the first remote processor is further configured to:

receive input from the first participant, the input being responsive to a first question or prompt from the at least one chat room processor; and format the input as a message and send the message to the chat room.

5. The system of claim 4, wherein the input is received after a message from another participant has been displayed to the first participant.

6. The system of claim 4, wherein sending the message to the chat room comprises the first remote processor sending the message to the one or more chat room processors.

7. The system according to claim 6, wherein sending the message to the chat room comprises the one or more chat remote processors sending the message to each participant in the chat room.

8. The system of claim 4, wherein sending the message to the chat room comprises the first remote processor sending the message to each participant in the chat room.

9. The system of claim 1, wherein the one or more chat room processors are further configured to:

receive information from a researcher defining the chat room template;

create the chat room template based on the received information; and store the chat room template in a database.

10. The system of claim 1, wherein the one or more chat room processors are further configured to:

receive demographic information about each participant; and determine which chat room a user should be assigned to as a participant, based on the demographic information and the chat room template.

11. The system of claim 10, wherein the one or more chat room processors are further configured to:

ask each user one or more questions before determining which chat room the user should be assigned to as a participant;

receive responses to the one or more questions;

define demographic information about each participant based on the responses; and store the demographic information about each participant.

12. The system of claim 1, wherein the one or more chat room processors are further configured to generate a unique uniform resource locator (URL) for participants to enter an assigned chat room.

13. The system of claim 1, wherein the one or more chat room processors are further configured to place participants in a waiting room prior to being allowed to enter an assigned chat room.

14. The system of claim 13, wherein the waiting room shows a number of participants waiting and a countdown timer;

wherein the waiting room is configured to keep participants engaged while waiting by displaying one or more videos and/or allowing participants to play one or more games; or a combination thereof.

15. The system of claim 1, wherein the one or more chat room processors are further configured to send at least some of the information stored on the non-transitory computer readable storage medium to a researcher.

16. The system of claim 1, wherein the one or more chat room processors are further configured to receive input from a moderator while participants are sending messages in a chat room.

17. The system of claim 16, wherein the one or more chat room processors are further configured to mute or block a participant in the chat room based on the input received from the moderator.

18. The system of claim 1, wherein the one or more chat room processors are further configured to:

generate a translated message by utilizing a trained machine learning algorithm to convert a message received from a participant from a first language to a second language;

store the message and the translated message in a database; and send the translated message to all other participants in the chat room.

19. The system of claim 1, wherein the one or more chat room processors are further configured to:

perform a statistical analysis of the messages sent by participants in the chat room; and graphically display results of the statistical analysis.

20. The system of claim 1, wherein each of the plurality of remote processors is further configured to provide an interface for each participant utilizing a web browser, wherein the one or more chat room processors are in a cloud-based server, or both.

* * * * *